Sept. 8, 1953 W. G. STOREY 2,651,683

TELEPHONE SUBSET WIRING-PLAN SYSTEM

Filed Aug. 4, 1951

INVENTOR:
WILBUR G. STOREY
BY John I. Bellamy
ATTORNEY

Patented Sept. 8, 1953

2,651,683

UNITED STATES PATENT OFFICE 2,651,683

TELEPHONE SUBSET WIRING-PLAN SYSTEM

Wilbur G. Storey, Chicago, Ill., assignor, by mesne assignments, to Kellogg Switchboard and Supply Company, a corporation of Delaware Application August 4, 1951, Serial No. 240,336

5 Claims. (Cl. 179—81)

This invention relates to a telephone subset wiring-plan system. Its principal object is to provide an improved and more efficient system of the type wherein each of one or more subscriber subset stations includes key apparatus for connecting the subset thereat to either a local or an exchange telephone line.

A further object of this invention is to provide a system of the foregoing character which will afford the essential features of private-branch-exchange service to a small establishment.

A specific object is to provide a satisfactory and economical circuit arrangement using standard subset apparatus in combination with key switching, to provide both transfer and hold service, while insuring that the exchange telephone line will not be inadvertently left in "hold" condition indefinitely.

It has been chosen to illustrate the invention as embodied in a subset wiring-plan system wherein an exchange telephone line serving two or more substations is paralleled by a local line serving the same stations. Ringers may be permanently bridged across the exchange telephone line at each station, while the talking circuit is arranged to be switched from the exchange line to the local line by throwing a manual key to either of two off-normal positions. With the key in normal position, the telephone subset at each station may be used on the exchange line in the conventional manner. When the key is thrown to one off-normal position, it merely transfers the talking apparatus to the local line, but when thrown to the other position, it effects the same transfer but in addition, places a hold bridge across the main exchange line.

A feature of the invention is that the local line and exchange line may be used simultaneously, either independently of each other, or in conjunction with one another.

Another feature is that any station in the system can originate, answer, hold, or transfer calls over the exchange line, as well as originate and answer calls over the local intercommunication line.

A still further feature is that as many subsets may be added to the system as desired within the practical limits determined by the delay in traffic that may be borne over the system.

A further feature is that the arrangement can be made to work on dial service systems or on common battery manual systems.

Still another feature is that the line holding facilities of the system are effective only so long as the receiver of one of the subsets is removed, thus eliminating the likelihood of calls being permanently held without intention.

Other objects and features of the invention will become apparent as the description progresses.

Referring now to the drawings.

Figures 1, 2:
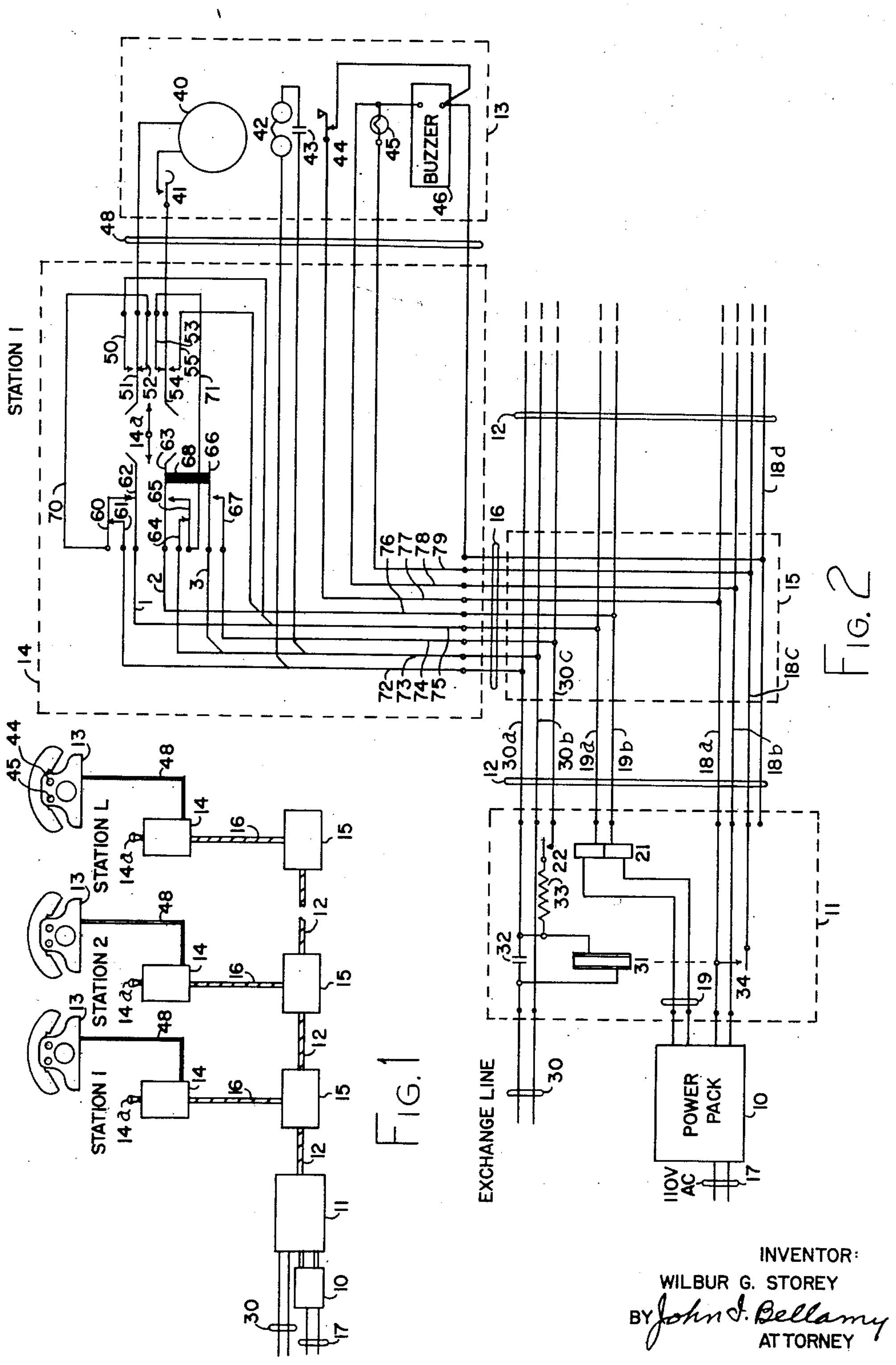
Fig. 1 is a schematic illustration showing the physical arrangement of component parts of the system embodying the present invention.
Fig. 2 shows circuit details of the arrangement of Fig. 1 embodying the principles of the present invention with one of the subset stations illustrated as representative of each station in the system.

The general physical arrangement illustrated in Fig. 1, shows that the system includes as common apparatus a power supply unit 10 and a relay unit 11 which operate in conjunction with several telephone stations connected to the common apparatus by way of a cable 12 which carries the leads necessary to effect the desired functions at each station of the system. Each station comprises a telephone subset 13, a three position key 14, and a junction box 15 wherein the station cable 16 joins the station equipment to cable 12.

The power supply unit 10 is of size and character designed to meet the power requirements of the local line and supervisory signal devices of the system. It may be merely a battery supply unit, but where commercial power is readily available, such as 110 volt alternating current, it may be more desirable, from the standpoint of maintenance and cost, to utilize such power and to change it to current and voltage of value for which the system is adapted to operate. Thus, in the usual installation, the power pack may merely comprise a form of rectifier and associated filter network for converting 110 volt alternating current to direct current in the order of 12 volts. If desired, however, the supervisory signal devices may be operated on alternating current by the addition of a transformer for changing the 110 volts to voltage values for which such devices are designed.

In the specific embodiment described herein, the power pack is supplied by commercial power, such as 110 volts A.C. fed over a pair of power leads 17. The output of the power pack is both alternating and direct current, each in the order of 12 volts, supplied over leads 18a and 18b, and leads 19 respectively.

The relay unit 11 as shown in Fig. 1 includes the relays and bridging component associated therewith which operate in conjunction with the key at each station to provide the hold and signal features of the system. Included in the unit is a slow-release relay 31 which is connected in series with one side of the exchange line 30 which is introduced to the system through the unit. With the relay 31 thus connected, it operates whenever a closed loop is formed on the exchange line 30, such as when a receiver is lifted at one of the stations while battery potential is applied at the exchange end of the line. Relay 31, also included in unit 11, is a slow-release relay which makes the system adaptable to dial service as well as common battery manual service systems. Relay 31 is made to be a slow-release relay so that its operation will not be affected by dial pulses when the circuit is utilized on dial service systems. Such slow-release characteristic has no modifying affect on operation of the system on manual systems with which it may be related.

A make contact set 34 associated with relay 31 closes whenever a call is being made over the exchange line 30. This operation extends the low voltage A. C. cupply lead 18*a* by way of a lead 18*c* to light a supervisory lamp at each station, as will be explained later.

A by-pass condenser 32 also in unit 11 is connected across relay 31 to permit the passage of alternating ringing current when the stations are to be signaled in notification of incoming calls. As indicated above each station of the system may have a ringer permanently bridged across the exchange line so that upon receipt of an incoming call each station will receive an incoming signal, but if desired, it is apparent that only one station may be provided with a ringer if other stations within the system are within hearing distance of the single ringer, or if an attendant is stationed at the one station to take all incoming calls.

The bridging component for the system may be a resistance 33 connected between the station side of the winding of relay 31 and the make contact set 22 of relay 21. The value of resistance 33 is preferably of magnitude close to that of the talking circuit of a telephone set, since it is used to replace such a circuit whenever an incoming call is to be held on the exchange line, as will be explained.

Although Fig. 1 shows only three stations (namely stations 1 and 2 and L), there is nothing peculiar to the system which limits it to only three stations, nor is it necessary that the system include as many as three stations. As many stations may be included in the system as desired within the limits permitted by the traffic that can be tolerated at each station with the addition of a new station. With the addition of each new station, it is apparent that more traffic will likely be borne by the exchange line, and thus, more possibility for delay in making and receiving calls will occur. But in contrast, with the addition of each new station, the intercommunication means becomes more valuable, both in facilitating the exchange of intelligence between stations, as well as in effecting greater efficiency in the use of the exchange line.

The subset 13 may be of the conventional type having a talking circuit 40, including a transmitter and receiver controlled by a hookswitch 41, and a ringer 42 arranged for connection across the exchange line 30 in the usual manner with a condenser 43 in series therewith to prevent the direct current from by-passing the talking circuit 40.

If desired, the subset 13 at each station may be adapted to directly incorporate a buzzer 46 for local line signalling, a push-button 44 to effect such local line signalling, and a busy lamp 45 to indicate when the exchange line 30 is in use. These components may be made part of the subset, or they may instead be mounted separately and apart therefrom within a convenient locale of the subset where the signal devices can be readily used and observed. This signalling arrangement, however, is particularly adapted to convenient association with telephone systems which are already installed without the necessity for complicated subset changes to effect such association. In the drawing, however, all three components 44, 45, and 46, are shown embodied within the subset 13; the push-button 44, and the busy lamp 45, being exposed, while the buzzer 46 is enclosed within the subset housing. While specific signal devices are herein described in association with the subset, it will be readily apparent to those skilled in the art that they may be easily substituted by other devices which will effect the same functions without changing the nature of operation of the system. For example, the busy lamp 45 might readily be substituted by an electromagnetic signal means, while the buzzer 46 could be replaced by a chime without varying the manner of operation of the system.

Leads connected to the subset components are brought out of the subset housing by way of a cable 48 which connects the parts to the three position key 14 through which connections are made by way of cable 16 to cable 12 within junction box 15. Each key 14 is the heart of the controls for its respective station in that the transfer, hold, and intercommunication features are all dependent upon key positioning.

As indicated above, each key 14 has a mid-position and two side positions. Each side position has a set of contact blades actuable by a key lever independently of the other, while when the key lever is in mid-position, both sets of blades remain in normal position. Referring to Fig. 2, the right side of the key 14 has two traveling blades 51 and 54. Traveling blade 51 is associated with front and back contact blades 50 and 52 respectively, while traveling blade 54 is similary associated with front and back contact blades 53 and 55 respectively. When the key lever 14*a* is thrown to actuate either set of contacts they are held in such actuated position until the key lever is thrown to another position.

The left side of key 14 has three traveling blades 62, 63, and 66, which are all actuated simultaneously when the key lever 14*a* is thrown to the position corresponding to such blades.

Traveling blade 62 has an associated make contact blade 60 and a break contact blade 61 arranged to constitute a make-before-break contact set. Similarly, traveling blade 63 has associated therewith, a make contact blade 65 and a break contact blade 64 also arranged to constitute a make-before-break contact set. Traveling blade 66 is associated with a make contact blade 68 and is arranged to be actuated simultaneously with traveling blade 63 by a non-conducting actuating member 69 which engages traveling blade 63 and is moved in conjunction therewith.

The talking circuit 40 is connected by a pair of leads in cable 48 to the traveling blades 51 and 54 of the key in series with hookswitch 41. The manner in which the talking circuit 40 of the subset 13 is connected to the lines is dependent upon whether the left hand stack of contact blades is in normal or actuated position. In the normal position of traveling blades 51 and 54, the talking circuit is connected to the back contacts 52 and 53 of such blades respectively, which in turn are connected by wire leads 70 and 71 to the make contact blades 60 and 65 respectively, in the left hand stack of contact blades. When both stacks of contact blades are in normal position, the talking circuit is connected to the exchange line leads 30_a_ and 30_b_ of cable 12 through the back contacts 52 and 53 of the right hand stack of contact blades, through the break contacts 61 and 64 of the left hand stack of contact blades, and by way of leads 72 and 73.

When the key lever is thrown to actuate the traveling blades 51 and 54, they are disengaged from the back contact blades 52 and 53 respectively and engage the front contact blades 50 and 55 respectively, thereby disconnecting the talking circuit from the exchange line leads 30_a_ and 30_b_ respectively, and transferring it to the local line leads 19_a_ and 19_b_ of cable 12, by way of leads 75 and 76.

From the foregoing, it is apparent that when the key lever 14_a_ is in mid-position, which is its normal position, the talking circuit 40 is connected across the exchange line leads 30_a_ and 30_b_. Whenever a local conversation is to be conducted between two or more stations of the system, the key lever of each such conversing statoon is thrown to the position which will actuate the right hand stack of contact blades so that the talking circuit is connected across the local line leads 19_a_ and 19_b_. In such position the talking circuit 40 of each of the associated subsets is completely disconnected from the exchange line, thereby leaving it free to be used by any other subset of the system, independently of local line operation.

The make-before-break contact sets of the key aid in preventing the loss of a call which is to be held on the exchange line while a station key is being transferred from normal to hold position. The contact sets do this by connecting the talking circuit of their respectively associated subset across the local line 19_a_ and 19_b_ before disconnecting it from the exchange line, thereby minimizing the possibility of the exchange line going dead before the bridging resistance 33 is connected across the exchange line by the local line relay 21. Correspondingly, upon transfer of a subset from the local line to the exchange line, the exchange line connection is made an instant before the local line is disconnected, thus eliminating the possibility of a held call being lost before removal of the holding bridge upon movement of the key from hold to normal position.

In many instances an exchange line call will be received at one station in the system which is to be transferred to another station within the system. In such instances the exchange line can be held while the answering party makes a call over the local line to notify the desired party that a call may be picked up at his station, or a buzzer signal may be used to notify him of such a call. When an incoming call is answered at a station of the system, the answering party will first see to it that the key lever 14_a_ is thrown to mid-position, before answering the call. If the party desired, by the calling party is at another station in the system, and it is desired to notify him directly over the local line, the answering party will throw the key lever to position to actuate the left hand stack of contact blades which will connect the subset to the local line and bridge the exchange line. During actuation of the key the traveling blades 62, 63, and 66, first make contact with their respective front contact blades 60, 65, and 67. This places the talking circuit 40 across the local line 19_a_ and 19_b_ and results in energization of the local line relay 21 and consequent closure of its make contact 22 for placing the bridging resistance 33 in series with the front contact blade 67 of the traveling blade 66. Since at the same time the talking circuit is being connected to the local line, the traveling blade 66 is being moved to close its front contact 67, a closed loop will be formed on the exchange line by the bridging resistance 33 when the local line relay 21 is energized. An instant following the connection of the talking circuit to the local line, the talking circuit is disconnected from the exchange line at the bridge contacts 61 and 64 associated with the traveling blades 62 and 63 respectively. Thus, the talking circuit 40 is connected across the local line and disconnected from the exchange line which will be held by the bridging resistance 33 as long as the key lever 14_a_ is retained in position to keep the left hand stack of contact blades actuated. It will be noted that the bridging resistance 33 is effective to maintain the exchange line relay 31 operated to hold the exchange line by reason of the resistance bridging the line leads 30_a_ and 30_b_ through the key blades 66 and 67, lead 74, and make contacts 22 at a point beyond the relay 31 opposite to that at which the exchange line leads 30_a_ and 30_b_ are introduced into the system.

At all times when the exchange line is being held, or is in use, the busy lamp 45 at each station in the system will light up as notification that the line is in use. This is accomplished at each station by connecting the busy lamp across the low-voltage alternating current leads 18_b_ and 18_c_ through the make contacts 34 of relay 31 which, as pointed out above, is energized at all times when the exchange line is in use. Such connection of the lamp 45 is effected by way of leads 77 and 78 which join the low-voltage leads 18_b_ and 18_c_, the latter of which is an extension of the low-voltage lead 18_a_ through the make contacts 34.

It will be noted with this arrangement, that the bridging resistance 33 is effective to hold the exchange line and to maintain the busy lamp 45 energized only so long as the local line 19_a_ and 19_b_ is in operation with the key lever positioned to actuate the left hand stack of contact blades of key 14. When the local line is hung up while the key is in such position, the exchange line cannot be held, thus the possibility of the exchange line being permanently held without intention is negligible.

Regardless of whether the local line is in use or not, the ringer 42 at each station is connected so that it will operate to notify the parties of the system that an incoming call is to be answered. Such connection is effected by connecting the ringer and its series condenser 43 across the exchange line by way of leads 72 and 73 which join the exchange line leads 30_a_ and 30_b_ in the junction box 15.

For local line signalling, the buzzer 46 is connected in series with a push-button 44 while the series branch itself is connected across the low-voltage alternating current leads 18_a_ and 18_b_ by leads 78 and 79 which also join cable 12 within the connection box 15. By providing a lead 18_d_ which joins all buzzers within the system at a point between their respective push buttons and buzzer terminals, all buzzers 46 of the system are joined in multiple so that all will operate simultaneously upon closure of any one push button within the system. Code signals may be assigned to each station in the system so the buzzer system can be used to notify the party at the station that either an exchange line call is awaiting him or that a call over the intercommunication system is awaiting him. For example, a possible code signal for transferring exchange line calls from the station answering an incoming call to the station desired may be one short buzz for the first station in the system, two short buzzes for the second station, three short buzzes for the third station, etc. A party at any station receiving one of the above signals over his buzzer will thus recognize, first, that an exchange line call is awaiting some party in the system and, secondly, which party is being called. The party at the desired station, before lifting the handpiece of his subset will then check to see that his key lever is in normal, or answer, position and then will answer, whereupon the party at the initial answering station may hang up.

Thus, the only operation necessary for a party to transfer a call by use of the buzzer is to code signal the desired station and remain on the line until the calling and called party are connected before replacing the receiver on the hookswitch of the telephone. The supervisory lamp 45 at each station will remain lighted until the exchange line call is completed and the called party restores his telephone handpiece to its hookswitch.

An intercommunication call may be signalled over the buzzer system by designating as a signal for such calls one long signal before designating by the short signal code which station is desired. Thus, any station receiving a signal preceded by one long buzz will recognize that a local line call is being made and which station is being called. The party at the called station is thus notified that he must throw his key lever to local line position before answering the call.

Besides making it possible to transfer and hold exchange line calls, and to effect calls between station, the system may also be used for conference calls over the exchange line. This may be done by providing a predetermined general call signal over the buzzer system which can be sent out by the party at any station, whereupon all parties may connect into the exchange line by answering with their respective keys in normal position.

I claim:

1. In combination, a first and a second common-battery telephone line, a station common to both lines and including a common-battery subscriber telephone set having a hookswitch for closing and opening the common-battery talking path therethrough, the station further including a switching key having a first and a second position corresponding to said lines respectively, contact means in the key for connecting the telephone set to the line corresponding to either position in which the key is placed, a relay connected in circuit with the second line and operable thereover subject to the key being in second position and to the hookswitch being closed, the relay including contact means closed with the operation thereof, the key having other contact means closed dependent on the key being in second position, and a holding bridge for the first line including the said contact means of the relay in series with said other contact means of the key, the respective contact means in the key being so associated in operation that, when the key is being moved from first position to second position, the telephone set remains connected to the first line until the said other contact means of the key have been closed and the telephone set has been connected with the second line, whereby the relay is able to operate over the second line to close a holding bridge for the first line by the time the telephone set is disconnected therefrom.

2. In combination, a first and a second common-battery telephone line, a station common to both lines and including a common-battery subscriber telephone set having a hookswitch for closing and opening the common-battery talking path therethrough, the station further including a switching key having a first and a second position corresponding to said lines respectively, first contact means in the key for connecting the telephone set to said first line responsive to said key being in first position and second contact means in the key for connecting the telephone set to said second line responsive to said key being in second position, said first and second contact means being so associated in operation that upon said key being changed to disconnect the telephone set from one line to connect it to the other the contact means corresponding to said other line is effective to connect said telephone set to such line before the set is disconnected from said one line, a relay connected in circuit with the second line and operable thereover subject to said second contact means connecting said telephone set to said second line and to the hookswitch being closed, the relay including contact means closed with the operation thereof, the key having other contact means closed dependent on the key being in second position, and a holding bridge for the first line including the said contact means of the relay in series with said other contact means of the key.

3. In combination, a first and a second common-battery telephone line, a station common to both lines and including a common-battery subscriber telephone set having a hookswitch for closing and opening the common-battery talking path therethrough, the station further including switching key having a first position corresponding to the first line and having second and third position each corresponding to the second line, contact means in the key for connecting the telephone set to the line which corresponds to any said position in which the key is placed, a relay connected in circuit with the second line and operable thereover subject to the second line being bridged, the relay including contact means closed with the operation thereof, the key having other contact means closed dependent on the key being in second position, and a holding bridge for the first line including the said contact means of the relay in series with the said other contact means of the key, whereby placing the key in second position directly bridges the second line and indirectly closes a holding bridge across the first line subject to the hookswitch being closed, while placing the key in its third position connects the telephone set with the second line while leaving the first line free.

4. In combination, a first and a second common-battery telephone line, stations common to both lines each including a common-battery subscriber telephone set having a hookswitch for closing and opening the common-battery talking path therethrough, each station further including a switching key for its telephone set having a first and a second position corresponding to said lines respectively, contact means in each said key for connecting its telephone set to the line corresponding to either position in which the key is placed, a relay connected in circuit with the second line and operable thereover subject to any key being in second position and to the hookswitch of the subset with which such key is associated being closed, said relay including contact means closed with the operation thereof, the key at each station having other contact means closed dependent on the key being in second position, and a holding bridge for the first line including the said contact means of the relay in series with the other contact means of any of said keys, said contact means for any said key being arranged to connect the associated telephone set to the second line and to close its said other contact means before disconnecting the set from the first line incidental to moving the key from its first position to its second, whereby said first line may be bridged continuously to hold a call thereon when the key at any of said stations is moved from its first to its second position, in which the talking path of the subset at such station is closed across said second line.

5. In a combination according to claim 4, a further relay connected in circuit with the first line and operable subject to the first line being bridged, and busy indication means for the first line operable responsive to operation of said further relay.

WILBUR G. STOREY.

References Cited in the file of this patent

UNITED STATES PATENTS

| Number | Name | Date |
|---|---|---|
| 1,783,310 | Saunders et al. | Dec. 2, 1930 |
| 2,069,038 | Labaugh | Jan. 26, 1937 |
| 2,341,027 | Edwards | Feb. 8, 1944 |

OTHER REFERENCES

Automatic Electric Co. Catalog #4037, page 3; March 15, 1933.